United States Patent
Vermeire et al.

(10) Patent No.: US 6,209,124 B1
(45) Date of Patent: Mar. 27, 2001

(54) METHOD OF MARKUP LANGUAGE ACCESSING OF HOST SYSTEMS AND DATA USING A CONSTRUCTED INTERMEDIARY

(75) Inventors: Dean R. Vermeire, Lenexa; Gary L. Murphy, Olathe, both of KS (US)

(73) Assignee: TouchNet Information Systems, Inc., Lenexa, KS (US)

( * ) Notice: Subject to any disclaimer, the term of this patent is extended or adjusted under 35 U.S.C. 154(b) by 0 days.

(21) Appl. No.: 09/385,903

(22) Filed: Aug. 30, 1999

(51) Int. Cl.[7] ........................................................ G06F 9/45
(52) U.S. Cl. .................................... 717/1; 717/8; 707/513
(58) Field of Search .................................... 717/1, 2, 5, 7, 717/8; 707/513, 100, 101, 522, 523, 524; 703/23, 27

(56) References Cited

U.S. PATENT DOCUMENTS

| | | | |
|---|---|---|---|
| 5,878,419 | * | 3/1999 | Carter ........................................ 707/10 |
| 5,905,248 | * | 5/1999 | Russell et al. .................... 235/462.27 |
| 5,940,075 | * | 8/1999 | Mutschler, III et al. ............ 345/335 |
| 5,943,424 | * | 8/1999 | Berger et al. ........................... 380/25 |
| 6,023,684 | * | 2/2000 | Pearson .................................... 705/35 |
| 6,026,409 | * | 2/2000 | Blumenthal ........................... 707/104 |
| 6,094,684 | * | 7/2000 | Pallmann ............................... 709/227 |

OTHER PUBLICATIONS

Karpinski, "Server Addresses Data Exchange", Internetweek, Mar. 1998, pp. 19.*

Senna, "XML bridges the gap", InfoWorld, Jun. 1998, pp. 88–90.*

Piven "XML Stakes out Web future", Computer Technology, Jun. 1998, 43–45.*

* cited by examiner

*Primary Examiner*—Kakali Chaki
(74) *Attorney, Agent, or Firm*—Spencer Fane Britt & Browne LLP

(57) ABSTRACT

A method of operating and communicating with a host computer system is provided using mark-up language inputs and outputs directed by an intermediary which has been previously constructed by formulation of the host data and program structures and host machine characteristics into a system of metadata which allows the reconstruction of requests and results into and out of mark-up languages binary data streams.

14 Claims, 2 Drawing Sheets

METHOD OF MARKUP LANGUAGE ACCESSING OF HOST SYSTEMS AND DATA USING A CONSTRUCTED INTERMEDIARY

BACKGROUND OF THE INVENTION

Legacy system computer applications that have been executing on mainframe computers, in some cases, for decades, continue to play a vital role in American commerce, education, and industry. Such software, in fact, has vastly outlived the time period during which its creators believed it would be useful. Doubts about the truth of the foregoing proposition vanish in the face of the billions of dollars that have been (or will be) spent by U.S. companies and the United States government in correcting computer code that is not Year 2000 compliant. The vast bulk of this code is substantially more than five years old.

Added to this vast mass of legacy systems are modern systems executing in modern environments, such as the client/server environment. These systems, like the legacy systems, suffer from the same basic limitation—the business logic and associated data are locked up in architecture-specific systems. Those using different operating systems running on computers powered by entirely different central processing units cannot effectively access the data and business logic residing on these conventional systems.

These conventional systems (both the legacy systems and the more modern systems) are not only important, they also represent substantial investments by companies. They are the product of billions of dollars of programmer compensation and untold millions of hours of business planning, strategic design, and work flow description. In many respects, the code embodied in these conventional systems describes the operations of everyday commerce in this country.

Today's technology culture differs widely from the environment that existed when most of these conventional systems were created. Access to computers is no longer limited to an elite handful of technicians with dedicated terminals hooked to gargantuan boxes located in specially cooled rooms. Today, virtually every worker has a personal computer sitting on his/her desk. Others, on the go, carry their computers in brief cases that connect to the home office via telephone lines. Consumers, from their dens and living rooms, are buying and selling stocks, checking their bank accounts, and (in some cases) telecommuting. The need to get the data and business logic out of the hands of the specially trained technicians and into the hands of every day people is great. The demand is the same, and the problem is the same, whether the important data and business logic resides on a legacy system or on a modern client/server system. Accessing and interacting with it from the outside, an external system, is a huge chore.

The demand is great, but, even more importantly, it is growing exponentially—with the explosion in popularity of the Internet and, especially, the World Wide Web. The number of trademark applications alone with terms like "e-biz," "e-business," "e-commerce," and the like is staggering. Clearly, commerce has moved to the net. Virtually no television advertisement and certainly no television news program fails to include a reference to its Internet or World Wide Web address.

Coupled with the popularity of the Internet has been another trend that has silently but markedly transformed the landscape of commerce and, indeed, everyday life in the United States. This is the trend toward self-service. Full service filling stations, for example, have almost been relegated to a dim memory. ATM machines have replaced tellers, and even some banks charge an extra transaction fee for using a human teller, as opposed to an ATM machine. The Internet itself is the ultimate expression of the trend toward self-service. Banking, book buying, car and home shopping, teaching, and even church services are available when the cyber-consumer wants it and without the presence of any human tellers, brokers, clerks, teachers, professors, registrars, or ministers.

Regardless of the computer system on which the application is running, the same basic disability exists. The data and business logic are locked up in an architecture-specific format. Almost universally, raw data is stored in a format shaped primarily by storage constraints, e.g., in relational database tables, and by retrieval considerations, e.g., indexes. This data is presented in business-useful human-friendly form only when acted upon by the architecture-specific computer application that carry out instructions based on business logic. In other words, the data resides in one generally useless format and is put in useful form only when acted upon by a separate computer application, which application is typically architecture-specific in terms of its functionality. Thus, whether the information and business logic are locked up inside a venerable legacy system or are stored in client/server systems in database tables, systems on the outside have difficulty in reaching into these conventional systems for not just the raw data, but the data in a form and format that has been filtered, selected, organized, and processed by intelligence that embodies an organization's business logic.

The problem, as noted above, is not just converting the data from one system to another. Difficult as that problem is, converting the raw data from a format on one magnetic medium to a different format on another medium has been done before. As noted above, however, conversion of the data does not solve the problem. The business logic that sorts, parses, selects, combines, performs operations upon, and presents this data in useful form is left behind. The raw data, even if converted, is just sitting there. It is no longer part of the system. It is just plain data.

In order to make this data, even after it is converted into a form that can be processed by an external system, of any use, it has to be combined with the business logic, e.g., combined with computer code that sorts, parses, selects, combines, presents, and otherwise operates on the data in ways that are meaningful to the business or institution that owns the data. That business logic already exists in the executable code still residing on the conventional system. The business logic needs to be duplicated or replicated in a form that the external system can use.

The process of reinventing the business logic is inefficient, time-consuming, and (in many cases) ineffective. It is inherently inefficient to operate two parallel systems—the conventional system and the external system. The conventional system represents a huge investment of time and money—an investment likely to have painfully escalated with the cost of making these conventional systems Year 2000 compliant. Reinventing these programs in another environment—the environment of the external system—hardly makes sense now. Moreover, the programmers who best know the organization's business logic, as it is embodied in the programs executing on the conventional system, are probably not the people who are best equipped to recreate the business logic in the new (external) environment. Almost by definition, they are trained on and have developed expertise in the environment of the conventional system, not the external system. Thus, if the business logic is to be recreated on the external system, those with the best knowledge of the business logic will need to be retrained in the language of the external system or, in the alternative, the job of recreating the business logic in the external system will be handled by those with no experience in the organization's business logic. Both approaches fall far short of the ideal.

An alternative to the solution described above—translation of the data and recreation of the business logic—would be to graft external system awareness into the conventional system. This approach is best illustrated by the efforts of some to transplant HTML-aware routines, libraries, and tools into legacy systems. Modern flavors of RPG, COBOL, Fortran, and others sport new web awareness tools and extensions. This approach has both advantages and disadvantages.

The main advantage of this approach is that it allows the legacy system programmer to continue to function in the environment in which he/she feels comfortable. These legacy system programmers do not have to become web gurus or become proficient in Java, HTML, and other web-based or web-aware languages.

The disadvantage involves the same problem of duplication mentioned above. The legacy system programmers who have just spent the last two or three years plowing through lines of codes that haven't seen daylight in decades to fix the Y2K problem now have to go through all those lines of code all over again, rewriting them to become not Y2K compliant, but web compliant. In other words, the systems will all have to be modified and/or rewritten using these new web-aware tools.

The applicant's invention permits organizations, companies, and institutions with legacy and other conventional systems to make not only their raw data but their business logic available to external systems without having to create a duplicate system in a parallel external universe and without requiring major code revisions in the conventional systems themselves. The applicant's novel approach takes the data after business logic has been applied within a running program and channels it into the external system environment intact, where the intact data is reconfigured into data that is understandable by the external system.

Moreover, this packaging and processing of intelligent data (data acted upon by the conventional system's business logic) takes place at the "code level." To understand what is meant by the phrase "code level," it is important to understand the preexisting "translation" technology. Because of the inherent differences between legacy system data formatting and language conventions and those popularized by the PC revolution, the most popular translation form is commonly referred to as "screen scraping." This moniker is actually very descriptive of the process that is in fact used. The data and business logic inherent in a legacy system are presented in meaningful, humanly comprehensible form when it is printed on the computer screen. It does not really matter whether the computer screen is hooked to a mainframe computer or a PC connected to the World Wide Web. What meets the human eye is equally comprehensible. The screen scraping technique, therefore, basically uses a series of algorithms to read and/or intercept the display function, scraping, as it were, that human-readable information and piping the result into an image projected on the screen of an external system.

The screen scraping technique has numerous problems. First, it is very computer intensive and very, very slow. Second, it is, of necessity, screen dependent. Screen scraping requires one to model the flow of a particular application. Modeling program flow entails a huge number of complexities, particularly where user input is involved or error recovery is required. When one is literally scraping the screen, it is necessary to anticipate which screen is coming next in program flow. Third, with screen scraping, it is assumed that the screens will be static. If, however, circumstances require modifications to any of the screens, regardless of the reason, further modification to the screen scraping system will be required to avoid errors. Fourth, screen scraping is extremely difficult when the business logic requires one to gather pieces of data from different screens and assemble all those bits and pieces of information together. Fifth, screen scraping is not scalable at all. It is inflexibly dictated by the architecture of the conventional system and the external system. Sixth, the result of screen scraping in the web environment is not particularly desirable. Without substantial further processing, its presentation is less than fully satisfying to the Web-experienced user. Indeed, without additional processing, it may be incapable of interacting with the user. Although, for discussion purposes, the foregoing has focused upon screen-scraping of legacy systems to make them Web-aware, the same issues exist regardless of the types of conventional systems and external systems involved.

Rather than scrape the screen, Applicant's invention involves taking a snapshot of the in-memory data, as it is being processed by the software applications residing on the conventional system. By taking a snapshot, not of the screen, but of the in-memory, real time image of the data, Applicant's invention operates at the code level and, hence, is highly efficient. It is also highly scalable. To interact with the business logic and data residing on the conventional system, conventional system programmers can continue to call upon their conventional system tools and expertise.

The Applicant's invention has none of the limitations that have plagued the prior art solutions. Indeed the disadvantages of the prior art offerings are matched item-by-item by strengths of the applicant's invention. Some of the advantages of the Applicant's invention are that it allows proven functionality to continue, using mature code that has been thoroughly debugged and is reliable. New applications do not have to be written in order to make the business logic and precious data available for interaction by persons operating systems different from the conventional systems. The Applicant's invention is not screen-dependant. Rather, the execution-time in-memory representation of the data, as acted upon by the business logic, is translated and made available to the external systems. At the same time, information from an external system, may be fed into and processed by the conventional system by means of Applicant's invention. In addition, Applicant's invention is scalable to an almost unlimited degree in that, by making the data and business logic available in any external system, including markup language systems, such data and business logic may be accessed and used on any platform. The data and business logic become wholly and completely platform independent. Another benefit is in the nature of human cost. To satisfy the demand for external system access to conventional system data and business logic, including markup language versions of the data and business logic now trapped inside conventional systems, it would be necessary to rewrite the application, with the attendant human costs in terms of both programming and training or retraining. The Applicant's invention also has the advantage of making conventional system data and business logic available to external systems without making huge demands on processor and computing resources.

SUMMARY OF THE INVENTION

The present invention blends information about host computer software application structures, called metadata, with either the XML representation or the binary data values to generate binary data for use with a host system or an XML representation for use in mark-up language applications. The invention utilizes a constructed intermediary which is user defined based upon the application language utilized by the host computer. The intermediary is further constructed to encompass the machine architecture and data structures involved in the host machine and application programs. This then allows the intermediary to function to restructure in-memory binary data streams received from the host into XML documents and to restructure XML documents into binary data streams capable of acting with the host machine and its program applications.

The foregoing and other objects are not intended in a limiting sense, and will be readily evident upon a study of the following specification and accompanying drawings comprising a part thereof. Other objects and advantages of this invention will become apparent from the following description taken in connection with the accompanying drawings, wherein is set forth by way of illustration and example, an embodiment of this invention.

DESCRIPTION OF THE DRAWINGS

Preferred embodiments of the invention, illustrative of the best modes in which the applicant has contemplated applying the principles, are set forth in the following description and are shown in the drawings and are particularly and distinctly pointed out and set forth in the appended claims.

DESCRIPTION OF THE PREFERRED EMBODIMENT

Figure 1:
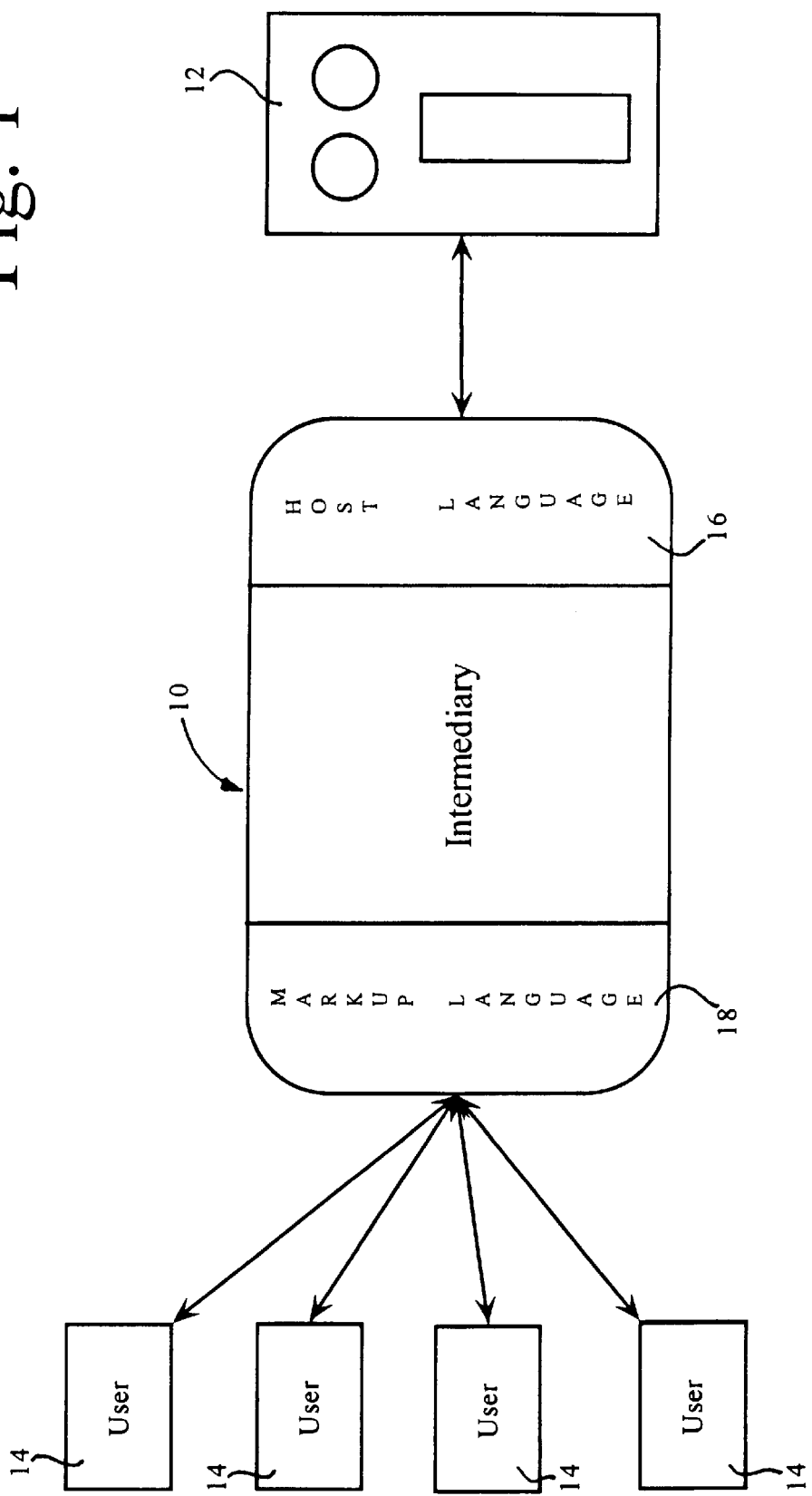
FIG. 1 shows the relationship between the XML users and the intermediary and the host system.

Referring now to FIG. 1, the present invention is comprised, generally, of an intermediary 10 which is interposed between users 14 and host system 12. The intermediary functions to send and receive content in a mark-up language such as Hypertext Mark-up Language (HTML) or any other developed mark-up language (XML) between intermediary 10 and users 14. The connection between intermediary 10 and users 14 can be any type of commonly employed connection ranging from an Internet connection or a direct or hardwire connection of an intranet which employs a mark-up language. The intermediary further functions to send and receive content in a host 12 format such as binary code between intermediary 10 and host 12.

Intermediary 10 is comprised of two principal components. The first of these is the determined host Machine and Programming Architecture and Host Data Structure (MPADS) component and the second is the Intermediary Runtime Engine (IRE) which applies the MPADS to the content that is sent or received between host 12 and intermediary 10 or between intermediary 10 and user 14 to permit the mark-up language interaction of the host 12 programming and data structure.

In general the MPADS component of intermediary 10 involves several functions. One is the insertion of additional read/write codes into host 12 program applications to call and/or direct input/output to or from host 12 and host 12 program applications. This insertion of additional read/write codes is based upon the information determined about the machine and programming architecture and the data structure of host 12. The MPADS also is used to direct the iterative steps employed by the IRE of intermediary 10 to restructure the content of both XML communications and host 12 communications to permit mark-up language interaction with host 12.

Intermediary Runtime Engine (IRE)

The intermediary comprises a set of object classes that collectively enable the processing of in-memory binary data from a host 12 into a user 14 XML application and vice versa. A scheme that applies the intermediary appears, generally, of the form shown in FIG. 1. In FIG. 1 the user 14 applications read and write XML documents while at the opposite side of intermediary 10 the host 12 application read and write binary records. From a high level view, neither of the two applications need be aware of the restructurings that are taking place.

The intermediary is flexible enough to be used in a variety of application systems where there is a need to present architecture-specific information in an architecture-neutral manner. The intermediary does not impose any limitations on the context in which it is used, rather the intermediary is partially formulated in relation to the context in which it is to be used through modification of the intermediary based on the host MPADS. One example of the use of the intermediary is with a batch program that will read a file of fixed-format records and apply the intermediary to generate an XML file for export to an XML based application. Another use of intermediary 10, which is more particularly described hereinafter, is to leverage conventional host 12 applications logic and data structures involving complex architectures for dynamic, interactive e-business applications.

Logic and Flow of the Intermediary Runtime Engine

The intermediary runtime engine merges a binary stream of data with information about the data. The information about the data has been previous determined as part of structuring the intermediary and is the host machine and programming architecture and host data structure or MPADS component of the intermediary. The merger of the binary stream of data with the MPADS information results in formation of an XML document. Similarly, the intermediary can read an XML documents and the associated information about the XML document to create a binary representation of the XML communication to create a binary representation of the information suitable for direct use by the application running on host 12.

The implementation of the intermediary to function on both binary to XML and XML to binary communications is complex as the intermediary must take into consideration the architectural considerations of all supported computer systems, the differences in character encodings, such as ASCII and EBCDIC as well as the differences in the byte ordering of integer numbers—known as "endian-ness." Nearly all machine architectures implement big-endian integer. This means that the most significant byte is first (as is the case with number read by humans). A few machine architectures, such as the Intel x86 microprocessors, represent integers with the least significant byte first, this is known as "little-endian" architecture. Other machine architectures implement data types that are not available on other platforms. The IBM S/390 architecture machines, for example, implement binary coded decimal (BCD) numbers and have machine instructions to manipulate directly those numbers. BCD numbers are not available on Intel or most RISC processors.

The second form of complexity comes from the way in which compilers create internal data structures. Most computer central processing units (CPUs) can perform arithmetic operations faster if the numbers on which they are operating are aligned on an even machine work boundary (usually an even multiple of two or four bytes). Compiler programmers know this and some languages will align the data types on even boundaries by inserting "filler" bytes in the data structure. For C programmers, the #pragma pack compiler directive affects this alignment. For COBOL programmers, the SYNCHRONIZED keyword is used. Table 1 illustrates the different binary layouts of no alignment versus four-byte alignment. The source data is a character string "VALUE" followed by a 16-bit number "1" and a 32-bit number "2."

TABLE 1

Bytes assuming no alignment

| 'V' | 'A' | 'L' | 'U' | 'E' | 00 | 01 | 00 |
|-----|-----|-----|-----|-----|----|----|----|
| 00  | 00  | 02  |     |     |    |    |    |

TABLE 2

Bytes assuming four-byte alignment

| 'V' | 'A' | 'L' | 'U' | 'E' |    |    |    |
|-----|-----|-----|-----|-----|----|----|----|
| 00  | 01  |     |     | 00  | 00 | 00 | 02 |

In Table 2, the shaded bytes represent unused bytes with undefined values. In both cases, the data types would look the same and the source language definition in some languages such as C would look identical in both cases. However, the intermediary must be able to differentiate between these alignments as the in-memory binary streams being processed are clearly different. It is all of these architectural and data structure issues which are described in the MPADS component of the intermediary and which therefore describe the structure of the data record and the machine architecture to which the data record relates. For convenient reference, these data which describe the structure of the data record and the associated machine architecture are referred to as MPADS metadata.

MPADS Components
MPADS Metadata of Machine Architecture

The metadata of MPADS specific to the machine architecture is a hand-coded constant table of data that maps the name of a data type to a rendering instruction. The rendering instruction is used by a component of the Intermediary Runtime Engine (the Binary Rendering Engine object) to convert the bytes appropriately. For example, the metadata about the record may identify a field as a "uint" which generically means a 32-bit unsigned integer. There is no indication, however, as to whether this is a big-endian or little-endian integer. The architecture metadata would map this to a rendering instruction of "LittleEndian32Bit" for Intel architecture machines and to "BigEndian32Bit" for IBM S/390 mainframe systems. The architecture metadata also identifies the number of bytes that are used to contain the underlying data and the preferred alignment for that data type.

The MPADS metadata about the architectural characteristics of a datatype are stored in an XML document. Table 3 shows a subset of the architecture metadata for Intel architecture:

TABLE 3

```
<?xml version="1.0"?>
<!DOCTYPE typedef SYSTEM "/XML/Typedef/typedef.dtd">
<typedef>
<type name="int"     size="4"   align="4"  render="LittleEndian32Bit" />
<type name="string"  size="-1"  align="1"  render="AsciiString"       />
<type name="char"    size="1"   align="1"  render="AsciiString"       />
<type name="binary"  size="-1"  align="1"  render="Binary"            />
<type name="byte"    size="1"   align="1"  render="Byte"              />
<type name="short"   size="2"   align="2"  render="LittleEndian16Bit" />
</typedef>
```

This is a straight-forward lookup table. There is no hierarchical relationship in the XML document.

MPADS Metadata for the Record

The MPADS metadata used to describe the record layout is more complex than the lookup table used for the architectural metadata. It has to model the structure found in modern programming languages. The metadata for the record is stored as a single XML document per record.

There are three ways in which data is organized in the data definition of a record in most computer programming languages. There are simple data types, such as integers or strings of characters. This information about a simple data type is described within the <field> tag in the XML document. The second way to organize data within a record is a collection of related simple fields that may be of different simple data types. The information about this heterogeneous collection is described with the <struct> tag in the XML document. The third way to organize data is a collection of the same data type. The information about this homogeneous collection is described in the <array> tag in the XML document. It is also important to note that the structure is more complex in that structs and arrays are not limited to fields. There can be arrays of structs and arrays of arrays as well as structs that contain arrays, fields and other nested structs. The result of this modeling is a recursive definition of arbitrarily complex data structures.

In spite of the modeling complexity, the Intermediary Runtime Engine (IRE) is ultimately concerned about a sequence of fields that need to be acted on or restructured to and from their binary representations into and from an element in an XML document. The present invention performs this restructuring to convert, in real time, the binary stream representing the data and business logic of a particular application or collection of applications. This restructuring is accomplished by the application by the IRE of certain MPADS metadata, or ground rules, definitions, and descriptions, which are developed in off-line mode.

Sample Conversion

A sample of how the data is rendered or restructured will serve to explain the inventive process in detail. Table 4 is a subset of the S/390 architectural metadata document that is used in this example.

TABLE 4

```
<?xml version="1.0"?>
<!DOCTYPE typedef SYSTEM "/XML/Typedef/typedef.dtd">
<typedef>
<type name="int"     size="4"   align="4"  render="BigEndian32Bit"  />
<type name="string"  size="-1"  align="1"  render="EbcdicZString"   />
<type name="char"    size="1"   align="1"  render="EbcdicString"    />
<type name="byte"    size="1"   align="1"  render="Byte"            />
<type name="short"   size="2"   align="2"  render="BigEndian16Bit"  />
</typedef>
```

The following record metadata, Table 5, describes some summary information about a student in higher education.

TABLE 5

```
<?xml version="1.0?>
<!DOCTYPE record SYSTEM "/XML/Meta/tmeta.dtd">
<record name="gradesresponse" architecture="s390"
                                             align="1">
    <field type="string" size="8">
        <name>studentid</name>
    </field>
    <field type="int">
        <name>pin</name>
    </field>
    <field type="byte">
        <name>years</name>
    </field>
    <field type="short">
        <name>classes</name>
    </field>
    <array size="2">
        <name>transcript</name>
        <struct>
            <name>GRADE-INFO</name>
            <association>coursedata</association>
            <field type="string" size="16">
                <name>course</name>
            </field>
            <field type="char">
                <name>grade</name>
            </field>
        </struct>
    </array>
</record>
```

The first two lines of the Table 5 XML document are required by the XML specification and are specified in the standards documents appropriate to the XML being utilized. It can be seen in the <record name> tag in the third line that the name of the record is "gradesresponse" and that the record came from an IBM S/390 mainframe architecture machine. It also can be determined from the "align" attribute that the record is unaligned (i.e. aligned on one-byte boundaries). The data that will be interpreted by this XML document for this example is shown in Table 6.

TABLE 6

| C7 | D3 | D4 | F9 | F8 | F7 | 00 | 00 |
|---|---|---|---|---|---|---|---|
| 00 | 00 | 07 | A8 | 03 | 00 | 02 | C9 |
| 95 | A3 | 99 | 40 | A3 | 96 | 40 | C3 |
| 96 | 94 | 97 | 40 | E2 | 83 | 00 | C1 |
| C8 | 96 | 94 | 85 | 40 | C5 | 83 | 96 |
| 95 | 96 | 94 | 40 | F1 | F0 | F1 | 00 |
| C4 | | | | | | | |

Given the XML metadata, of Table 5, and the binary stream of Table 6, the IRE would begin at the top of the XML document and start consuming the number of bytes from the host data stream, Table 6, that are required for each field. In the first case, we have a string that takes 8 bytes. A "string" data type is defined as a sequence of characters up to a certain length that ends when the first zero byte is encountered. In this case, the first 8 bytes of Table 5, which represents a binary data stream, are read, giving us "c7d3d4f9f8f70000." The IRE looks up the rendering instruction in the architecture metadata document, Table 4, for strings and determines the rendering instruction to be "EbcdiZString" which indicates an EBCDIC to ASCII translation until the first zero byte is encountered. This renders the string "GLM987" as the student ID. Note that the metadata reserved the full 8 bytes for the datatype, although only the first six are significant since the rule for a string indicates that the data after the first zero byte is ignored. The IRE also renders the name of the field as the tag in the XML document. This results in the XML document portion shown in Table 7.

TABLE 7

<studentid>
GLM987
</studentid>

The next field of Table 5 is an "int" which indicates a 32-bit signed integer. Again, the IRE looks up "int" types in the architecture metadata of Table 4 and determines that they are 4 bytes long and for S/390s are "big-endian." This results in a rendering instruction of "BigEndian32Bit." The next four bytes in the stream "000007A8" are rendered as the decimal number "1960." Again, the name of the field is rendered by the IRE as the XML output tag and the XML document portion shown in Table 8 is produced:

TABLE 8

<pin>
1960
</pin>

The next field of Table 5 indicates a one-byte value. The next byte ("03") is removed from the stream, a rendering instruction is obtained from the architecture metadata and the "03" byte is rendered into the value of "3." This XML portion is shown in Table 9.

TABLE 9

<years>
3
</years>

Next in Table 5 is the field "short." Again, the realtime framework looks in the architecture metadata of Table 4 and discovers that a short is two bytes long and for S/390 architecture gives a "BigEndian16Bit" rendering instruction. The next two bytes ("0002") are consumed from the binary data stream and are converted into the string "2." Again, the name is used as the XML tag to generate the document portion shown in Table 10.

TABLE 10

<classes>
2
</classes>

The next metadata of Table 5 is an <array> tag. This doesn't consume any binary information, but the attribute of the array tag indicates that this array contains two of whatever is contained within its tags. Again the name of the array is used as the XML tag by the IRE. At this point in the field-by-field rendering process, the IRE recognizes that there are starting and ending array tags, but the IRE cannot determine the contents of the array, so this document portion is represented by Table 11.

TABLE 11

<transcript>
content not known
</transcript>

Next in Table 5 is the metadata tag <struct>. This also indicates a collection of information between tags, but the type of information does not have to be of the same data type as an array requires. Again, at this stage in the process, the IRE does not know what the content between the <struct> tags will be, but it recognizes that there will be a collection of data types within it. Also is present in Table 5 an <association> tag. This indicates that the associated name should be used instead of the name for the tag. The name will be generated from the variable name used in the source language (copy book or header files, depending upon the application language) supplied when the metadata is constructed. There may be cases, where another name is more descriptive than a variable name, or there may be a desire to change from all upper case (as is the case with most COBOL programs) to a mixed case tag names for better readability. For this reason, the tools which assist in the construction of the metadata permits name and similar editing. Thus, for the subject structure the following XML portion of Table 12 results.

TABLE 12

<coursedata>
content not known
</coursedata>

The next two fields contained within the structure tag of Table 5 define the next two data elements. Since the process for rendering a field should be clear by now, it is sufficient simply to state that the next 16 bytes for the course and the subsequent byte for the grade are read and converted from EBCDIC to ASCII because of the rendering instructions for each of those two fields. From this process the document portion shown in Table 13 results.

TABLE 13

<course>
Intro to Comp Sc
</course>

TABLE 13-continued

<grade>
A
</grade>

As the two fields of Table 13 are contained in the metadata shown in Table 5 as part of structure, the IRE can now determine that the above data belongs between the <coursedata> start and end tags.

At this point, structurally, the IRE has progressed to the end of the metadata XML document of Table 5 as only the matching end tags for the fields, structs and arrays remain. The translation process, however, is still not complete. As shown in Table 5, only one of the elements in the array—the course data structure—has been processed. The array tag stated that there were two elements in the array. Therefore, it is indicated to the IRE to "loop back" to the start of the array and process the contents that make up an element of the array. This presents a second course of two course data structures. Illustrating the complexity of the process, yet another structure of course data which in turn contains two fields. Those two fields are a 16 byte course name and a one byte grade. When rendered as above, the XML document portion of Table 14 is provided.

TABLE 14

<course>
Home Econom 101
</course>
<grade>
D
</grade>

This completes the second course data structure, which also is the last element of the array, therefore, the IRE now recognizes what information goes inside the array's <transcript> begin and end tags. The only remaining issue to the assemblage of all the portions into a complete XML document. The initial record Tag of Table 5 indicated a name of "gradesresponse" therefore this becomes the tag for this collection of information. Table 15 shows the XML representation that results from the foregoing process.

TABLE 15

<gradesresponse>
  <studentid>
  GLM987
  </studentid>
  <pin>
  1960
  </pin>
  <years>
  3
  </years>
  <classes>
  2
  </classes>
  <transcript>
    <coursedata>
      <course>
      Intro to Comp Sc
      </course>
      <grade>
      A
      </grade>
    </coursedata>
    <coursedata>
      <course>

TABLE 15-continued

```
            Home Econom 101
          </course>
          <grade>
          D
          </grade>
        </coursedata>
      </transcript>
    </graderesponse>
```

There are significant advantages in manipulating the above XML document instead of the original binary data stream Table 6. First, third-party software tools are available to manipulate XML documents such as the one of Table 15. These tools enable distribution of the XML content to an e-Commerce or business environment much quicker. The second advantage is that all the architectural complexity of rendering binary data is removed from the applications programmer. While the document of Table 15 may appear cryptic to those unfamiliar with tagged data, it is much more easily manipulated than the stream of binary data of Table 6 with which we started. Moreover, the XML document is platform independent. All of the complexity of rendering data in an architecture-specific manner has been eliminated as well as the field alignment issues that were not illustrated by this example.

Programming to the Intermediary Runtime Engine

It is desirable that the IRE be easy to program for most applications. However, if there is a need for more specialized work, the top layer of the intermediary can be peeled back and the programmer can override specific methods of the classes inside the intermediary. In doing so, the programmer is exposed to some additional complexity. In a simple case, the pseudo code appears as shown in Table 16.

TABLE 16

```
in = new InputRecordProcessor();
out = new OutputRecordProcessor();
in.setInput(<input stream>);
in.setWriter(<XML destination);
out.setOutput(<output stream>);
out.setReader(<XML source>);
while(!done)
  {
  in.readRecord("name");
  out.writeRecord("name");
  }
// Close all of the streams
```

The input and output streams are binary, architecture specific records and the Reader and Writer are text XML documents.

Obviously some preparation work has to be done for the intermediary to know how to process the information. Clearly, the Intermediary must know the format of the binary data. Specifically, it must know where the field boundaries are within the record and the data types of the fields. This data about the data is called "metadata" and is kept external to the program, so no programming changes are required to process different record layouts. The metadata also is kept in an XML document as well.

The architecture of the system sending and receiving the binary data changes how the data are interpreted. Architecture information includes things such as the character set in use such as ASCII or EBCDIC and the byte-ordering of the integer data types. This byte ordering is referred to as "endian"-ness. Intel is little-endian. Most other architectures are big-endian. A 32-bit integer from a S/390 mainframe is different than a 32-bit integer on an Intel machine. Therefore, it is necessary to have metadata about the metadata. This, too is kept separate from the application program, so no programming changes are needed in the application if it is moved from a S/390 mainframe to a Unix system and recompiled into an equivalent application on a different architecture.

InputProcessors and OutputProcessors

Referring to the pseudo code in Table 16 above, it appears that the InputProcessor and OutputProcessor classes are doing all of real work. However, these processors simply couple the collection of "visitor" classes to the IRE. They just pass the work to the next lower layer down—visitors and metadata runtime. To understand this layer, it is important to understand the structure of XML and how they are parsed into Document Object Model (DOM) documents.

XML documents are self-describing arbitrarily complex collections of hierarchical data. That is, every document is a tree of nodes and each node is a collection of zero or more child nodes. In taking a look at complex data structures in modern programming languages (and COBOL too), one can see that they too are arbitrarily complex collections of hierarchical data. Language structures can be constructed in three ways. They can be fields of simple data types such as integers, strings or characters. They can be collections of homogeneous data structures or fields (aka an "array") or they can be collections of heterogeneous information (for example a"struct" in C or a level of a record in COBOL). Of course, each of these collections can be collections of complex data structures as well. Arrays of structs or structs that contains arrays in addition to fields are well known in the art. Therefore, just like XML, data structures are recursively defined and can be represented by a tree structure.

The metadata DTD states that a record has a name, an architecture and a record alignment It also states that a record contains one or more structs, arrays, or fields. A structs and arrays contain one or more arrays, structs or fields. Fields are the atomic data types that have a type name, an optional size, etc as well as some information on how to format the data. An example of a metadata XML document is shown in Table 17.

TABLE 17

```
<?xml version="1.0"?>
<!DOCTYPE record SYSTEM "/XML/Meta/tmeta.dtd">
<record name="gradesresponse" architecture="intel" align="4">
  <field type="string" size="6">
    <name>studentid</name>
  </field>
  <field type="int">
    <name>pin</name>
  </field>
  <field type="byte">
    <name>years</name>
  </field>
  <field type="short">
    <name>classes</name>
  </field>
  <array size="3">
    <name>transcript</name>
    <struct>
      <name>GRADE-INFO</name>
      <association>coursegrade</association>
      <field type="string" size="16">
        <name>course</name>
      </field>
      <field type="char">
        <name>grade</name>
      </field>
    </struct>
```

TABLE 17-continued

```
    </array>
  </record>
```

Metadata Runtime and its Visitors

The metadata runtime object parses the metadata XML that matches the name of the record that it is expecting to see on the binary input data stream. The parser creates a tree that is a DOM document. The metadata runtime simply traverses this tree. The traversal of the metadata tree is the same for input records and output records. The processing of the data at each node is significantly different for input (binary to XML) than it is for output (XML to binary). Since it was desired to reuse the tree traversal with different processing at each node, the Visitor design pattern was used.

The object model defines the MetadataRuntime class and the following hierarchy of visitors:

RecordVisitor (interface)
   DefaultinputRecordVisitor (class)
   DefaultOutputRecordVisitor (class)
Struct Visitor (interface)
   DefaultinputStructVisitor (class)
   DefaultOutputStructVisitor (class)
Array Visitor (interface)
DefaultInputArrayVisitor (class)
   DefaultOutputArrayVisitor (class)
Field Visitor (interface)
   DefaultlnputFieldVisitor (class)
   DefaultOutputFieldVisitor (class)

Some behaviors are the same for all input visitors and some behaviors are the same for all output visitors. Common behavior was placed into two abstract classes appropriately named BaseInputVisitor and BaseOutputVisitor. All of the default visitor classes implement the appropriate interface and extend (subclass) one of the two base visitor classes.

Each visitor has a method called when the node is first visited and when the node is exited. The basic form of the method is shown in Table 18.

TABLE 18

```
process TypeDescriptor(TypeDescriptor descriptor);
and
process TypeDescriptorEnd(TypeDescriptor descriptor);
```

In Table 18 "type" is the type of node being visited; namely Record, Struct, Array or Field.

The descriptor object that is passed to the visitor contains information about the data type represented by the node. It is a object form of the XML data for that node type. The descriptor obviously contains the datatype as well as size information, formatting information, etc. The common attributes were placed into an abstract class BaseDescriptor. The StructDescriptor, ArrayDescriptor, RecordDescriptor, and FieldDescriptors all inherit from that base descriptor class.

In traversing the metadata Document Object Model (DOM) document and either rendering binary data (input) or XML data (output), there is a need to keep track of information that is global to the record being processed. This "state" information includes such things as the offset into the record, alignment requirements for the record, etc. The behaviors common to input and output record states were placed in the abstract class BaseRecordState. The InputRecordState and OutputRecordState extend this base class for behaviors that are specific for their I/O requirements.

Figure 2:
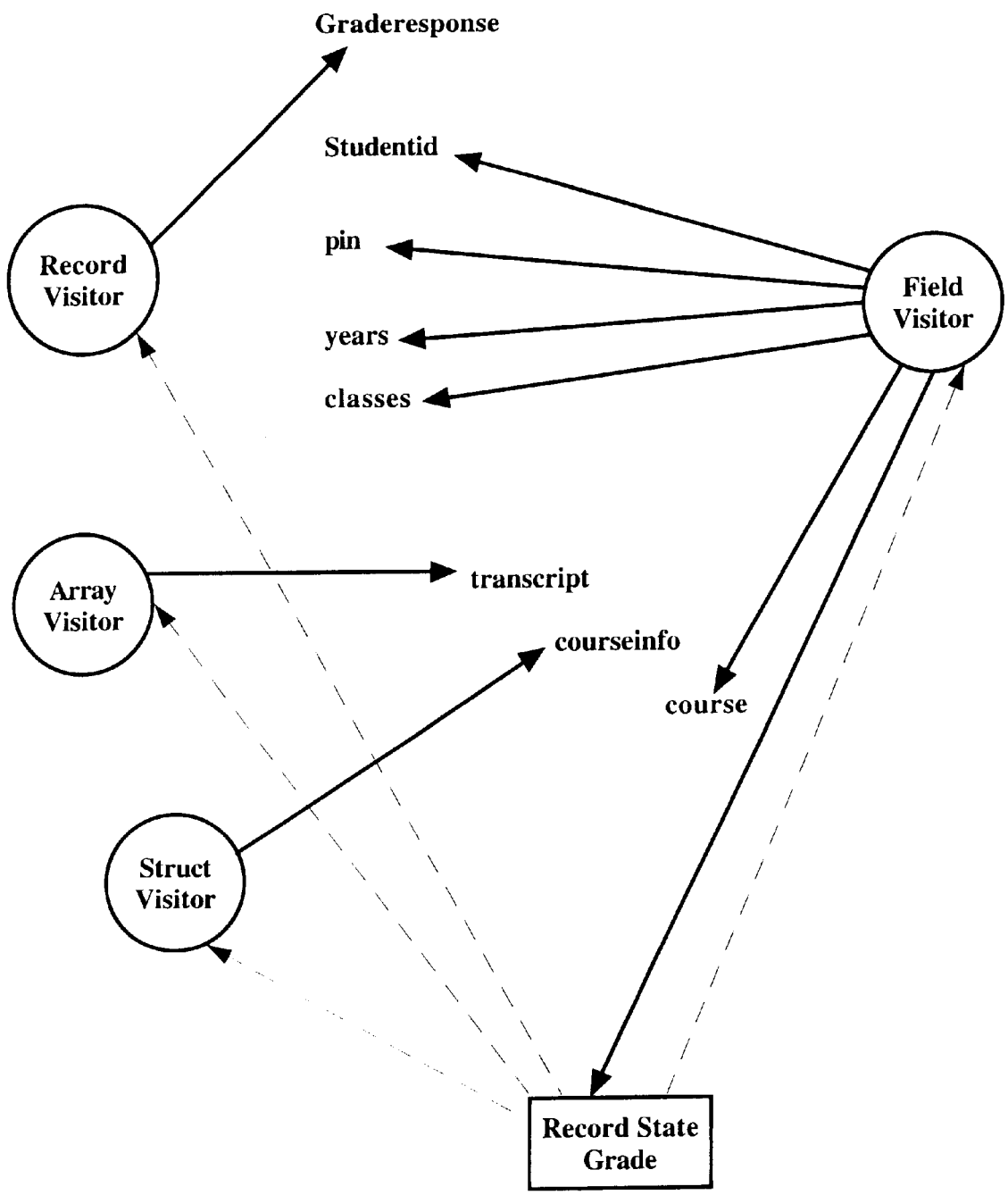
FIG. 2 shows the interelationship between the fields and the visitor class.

FIG. 2 shows a record that is being visited by the object appropriate for its structural type (i.e. field, struct, array or record). Each visitation will result in the record state information being updated and possibly data, XML or binary, being emitted to the stream to which it is assigned.

Next, the transformation of architecture specific information to and from strings that live in XML documents will be discussed. That is the lowest level of the object model. The only time a programmer will have to be concerned with these lowest level details is when a new data type is being added to the framework.

Rendering Fields. The Bits and Bytes

A principle object of the intermediary is to transform binary data to and from character data that is part of an XML document. The field visitor will handle the transformations during the processFieldDescriptor method. Instead of coding the handler for each data type in a switch statement, it is desirable to abstract those behaviors out as well. Since each architecture potentially renders each data type differently, a field visitor is required for Intel architecture and another field visitor is required for S/390 architecture and yet another for RISC architectures.

The Command design pattern was chosen to implement the rendering mechanism. First, all of the possible rendering commands were abstracted out and placed in the BinaryRenderingEngine class. This class is a collection of static methods that convert strings to byte arrays and byte arrays to strings. The type descriptor for each field contains a rendering instruction that is specific to its type and its architecture. These typedescriptor-to-rendering-instructions are kept external to the application code. That is the metadata about the metadata that was discussed in the introductory paragraphs on programming the framework. Each machine architecture has its own type-to-rendering instruction table. We know the architecture of the record because that is one of the attributes of the record. These tables of metadata about the metadata are kept in another set of XML documents. Such an XML document for the meta-metadata for Intel architectures appears in Table 19.

TABLE 19

```
<?xml version="1.0"?>
<!DOCTYPE typedef SYSTEM "/XML/Typedef/typedef.dtd">
<typedef>
  <type name="int" size="4" align="4"
      render="LittleEndian32Bit"            />
  <type name="string" size="-1" align="1"
      render="AsciiString"                  />
  <type name="char" size="1" align="1"
      render="AsciiString"                  />
  <type name="binary" size="-1" align="1"
      render="AsciiString"                  />
  <type name="byte" size="1" align="1"
      render="Byte"                         />
  <type name="short" size="2" align="2"
      render="LittleEndian16Bit"            />
</typedef>
```

To add another data type, the programmer adds the rendering instruction to the XML documents for the architectures on which that data type can exist. If there is a rendering method in the BinaryRenderingEngine, the work is done. In most cases, there will have to be additional methods to handle the data type. These are added to the engine with the matching rendering instruction.

Logic and Flow of the MPADS Component

The MPADS component of present invention is used during design of the Intermediate 10 (FIG. 1) to generate the metadata for a specific data record layout in an application residing on host 12. The MPADS component is not used during the flow of binary data streams to and from the Intermediary during operation of the IRE. The inventive method relies upon determination of the record layout which defines the fields, structures and arrays of the source code of the application program residing on host 12. This determination is followed by generation of the record metadata information. This avoids the inevitable mistakes that would result if the metadata were generated manually.

It is to be appreciated that the IRE best functions with metadata that is language independent. Each language has its own syntax and semantics for describing data layouts. The MPADS is responsible for parsing the source code and generating the metadata in such a way that the IRE does not need to be concerned with language dependencies.

The language used in the applications program resident on host 12 is identified for MPADS. MPADS then loads the language-specific parser for the identified language. The operator of the MPADS component of the Intermediary then selects the file containing the source language data (i.e. the "copybook in COBOL or the "header file" in C or C++). The parser then generates a language independent representation of the structure and datatypes found in the source code. The operator of the MPADS component is given the opportunity to make edits to the definitions, however, such changes would not be expected to change dramatically the datatypes that were discovered by the parser. When edits are complete, the MPADS metadata for the XML being used is then available for the IRE to generate restructured communications between XML and host 12 machines.

In an additional example, the XML document of Table 20.

TABLE 20

```
<?xml version="1.0"?>
<!DOCTYPE record SYSTEM "/XML/Meta/tmeta.dtd">
<record name="gradesresponse" architecture="intel" align="4">
    <field type="string" size="6">
        <name>studentid</name>
    </field>
    <field type="int">
        <name>pin</name>
    </field>
    <field type="byte">
        <name>years</name>
    </field>
    <field type="short">
        <name>classes</name>
    </field>
    <array size="3">
        <name>transcript</name>
        <struct>
            <name>GRADE-INFO</name>
            <association>coursegrade</association>
            <field type="string" size="16">
                <name>course</name>
            </field>
            <field type="char">
                <name>grade</name>
            </field>
        </struct>
    </array>
</record>
``` could have been generated from the C or C++ structure definition shown in Table 21.

TABLE 21

```
struct
{
    char studentid[6];
    int pin;
```

TABLE 21-continued

```
    char years;
    short classes;
    struct
    {
        char course[16];
        char grade;
    } transcript[2];
}
```

It should be appreciated that C does not have a native "byte" data type. Therefore, it would be necessary to instruct the MPADS component that the "char" data should be used as a numeric byte. It should also be noted that the structs do not have names that can be picked up from the source code, so the workbench user would have to name the structured data.

Alternatively, the XML document of Table 20 could have been generated from COBOL source code which would have appeared as in Table 22.

TABLE 22

| 01 gradesresponse | |
|---|---|
| 05 studentid | PIC X(6). |
| 05 pin | PIC S9(6) COMP. |
| 05 years | PIC X. |
| 05 classes | PIC S9(2) COMP. |
| 05 GRADE-INFO | OCCURS 2 TIMES. |
| 10 course | PIC A(16). |
| 10 grade | PIC A. |

COBOL does not inherently use zero-byte terminated character data as strings. Therefore, the MPADS operator would have to change the data type if the host code was padding unused characters with zero-bytes instead of the blank padding that would be typical of a COBOL program. In both cases, the MPADS component does the "busy work" of parsing and mapping each data element to the XML metadata format. The MPADS operator simply makes minimal edits before the metadata is generated.

MPADS Component of the Intermediary

The MPADS component is used during the design of the Intermediary for each host program application for which construction of a metadata XML document is needed to be later used by the IRE described above. The bulk of the work is handled for the MPADS operator through the MPADS component reading the host application source code (for example, COBOL copybooks or header files for other languages) and building a tree representation of that information in the mapping table or, by way of illustration, in the copybook. This then can be edited by the operator to make minor modifications to the information and save the metadata in a location that is accessible by the IRE. Thus, the MPADS component of the Intermediary is comprised of two major components—the operator interface and the application model which allows for actual processing of the particular language source code, for example, the COBOL copybook, for building a the tree representation of that information.

Source Code Parser

The parser is responsible for reading the source language header files (for example, in COBOL, the copybook) and creating a language-independent rendition, in a tree, of the data type information found in the source file or files. The parser incorporated in the preferred embodiment of the present invention is an LALR(1) (look-ahead one token, left-to-right parsing) context-free grammar. The parser-generator creates the following classes:

CopyBookLexClass
CopyBookYaccClass
CopybookLexTable
CopyBookYaccTable

The CobolYaccClass overrides the CopyBookYaccClass so that the code could be regenerated without losing modification made to the generated code. The primary method is reduce. That is called whenever a parsing rule is invoked. That enables this code to retrieve information off the parse stack and collect it for further processing. The full behavior of LALR(1) parsing is beyond the scope of this document, but is well documented and known to those skilled in the art. The goal of the parsing process becomes more tangible when looking at how it interacts with the rest of the objects in this sub-framework. The goal of the parsing process is to create a ParserCommand. A ParserCommand contains all of the information about a source code element (e.g., an array, structure or field) that is required to construct a node in the tree. A ParserCommand is emitted for each field, structure, and array when parsing is complete as well as some intermediate commands that may be required for processing of semantic information. There is likely to be a language-specific subclass of ParserCommand and a language-specific implementation of a ParserCommandHandler for each language. In the example of COBOL parsing, the resultant CobolCommand object will contains all of the relevant information that is determined by the parser during COBOL parsing.

The lexing, parsing and command generation are coupled with the command handling in the CobolParser object. That is, the CobolParser object implements the ParserCommandHandler so all of that command generation and processing are hidden inside the CobolParser object. The CobolParser actually is a subclass of the abstract SourceParser class so different languages can be implemented without changing any of the rest of the object mode. The SourceParser class contains the constructed language-independent tree of information from the parsing process.

Source Code Tree

The source code tree is implemented in the class RecordTree. It extends the Java Swing class of MutableTreeModel so that it can be easily manipulated via An operator interface. This is a language-independent rendering of the information in the source code, so all user-interface interaction with this tree is reusable when other languages are supported.

The tree is a collection of BaseTreeNode objects. The BaseTreeNode is an abstract class that contains all of the information common to the specific node types. Each concrete implementation of the BaseTreeNode is one of the following:

RecordTreeNode
StructTreeNode
ArrayTreeNode
FieldTreeNode

As the name implies, they represent either elementary data types (i.e. the FieldTreeNode) or a collection of multiple fields in arrays or heterogeneous structures—arrays or structs. There is one RecordTreeNode per record and is essentially the same as a struct, but contains a little additional information about the record as a whole.

Once this tree is modified by the operator interface in the MPADS component, the metadata XML can be generated from the contents of the Swing tree. The visitor design pattern is once again used to separate the tree traversal with the per-node processing. The visitor interface is defined in TreeVisitor and is implemented in the XMLWriter class. The traverses method of the RecordTree class will provide the iteration through the tree. The only other class, with few exceptions, is the TreeSearcher class. It also implements the TreeVisitor class and is used to search for a node with a particular name.

MPADS Component Operator Interface

The operator interface for the MPADS component accomplishes three tasks. It invokes the parser to convert the source code into a tree form, provide editing for the tree and generating the metadata XML using the XML Writer class. Implementing the second of these tasks is a considerable amount of work, but conceptually the goal is straightforward.

The editing portion of the MPADS component should allow the operator to be able to change data types, (although this will be done rarely) and it will have to be able to resolve memory overlays within the structure so that the IRE can know which representation of memory to use. Memory overlays occur when language semantics allow a section of memory to be mapped in more than one way. In C and C++ the union keyword is used to overlay memory. In COBOL the REDEFINES clause will map the same memory range in multiple ways. The getOverlays method will return the name of the node over which this node is remapped if there is an overlay. The operator interface will have to traverse the tree matching names and asking the MPADS component operator which set(s) of metadata should be generated with the different memory mappings.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the inventions is by way of example, and the scope of the inventions is not limited to the exact details shown or described.

Certain changes may be made in embodying the above invention, and in the construction thereof, without departing from the spirit and scope of the invention. It is intended that all matter contained in the above description and shown in the accompanying drawings shall be interpreted as illustrative and not meant in a limiting sense.

Having now described the features, discoveries and principles of the invention, the manner in which the inventive MPADS component and intermediary runtime engine are constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the invention herein described, and all statements of the scope of the invention which, as a matter of language, might be said to fall therebetween.

Having thus described the invention what is claimed as new and desired to be secured by Letters Patent is as follows:

1. A method of providing mark-up language interaction with a host computer system having a host computer system architecture and a software application executing thereon the software application utilizing host computer system data records and host computer system information processing commands and the mark-up language operating in its native format the method comprising the steps of:

a) inserting information transfer codes into the host system software application to direct information transfers between the host and an intermediary, b) generating metadata for use by said intermediary, said metadata containing an information set of the host computer system architecture and an information set associating the host binary data stream with the mark-up language format to allow said intermediary to select a portion of a mark-up language request and allocate said portion to form a binary data result compatible with said host computer system, and c) operating said intermediary on a mark-up language request to generate a result for use by the host system, said result communicating information contained in said mark-up language request.

2. The method as claimed in claim 1 where in said step of generating metadata comprises the step of identifying data elements contained in the host software application.

3. The method as claimed in claim 2 further comprising the step of plotting the location of said identified data elements within a data input format of the host software application to form a data elements input location plot.

4. The method as claimed in claim 3 further comprising the step of associating said data elements input location plot with the mark-up language format.

5. The method as claimed in claim 1 where in said step of operating said intermediary comprises the steps of:
   a) presenting, to said intermediary, a mark-up language request for a result,
   b) restructuring said mark-up language request with said intermediary by applying said metadata to said request to provide an inquiry processable by the host software application,
   c) sending said inquiry from said intermediary to the host system,
   d) receiving said inquiry by the host system as directed by said transfer codes, and
   e) conducting operations of the host software application in response to said inquiry to generate a result by the host system responsive to said request.

6. The method as claimed in claim 5 where in said step of restructuring said mark-up language request with said intermediary comprises applying a data elements input location plot and associating said data elements input location plot with the mark-up language format of said request to provide an inquiry processable by the host system application.

7. A method of providing mark-up language interaction with a host computer system having a host computer system architecture and a software application executing thereon the software application utilizing host computer system data records and host computer system information processing commands and the mark-up language operating in its native format the method comprising the steps of:
   a) inserting information transfer codes into the host system software application to direct information transfers between the host and an intermediary,
   b) generating metadata for use by said intermediary, said metadata coding comprising:
      i) identifying data elements contained in the host software application,
      ii) plotting the location of said identified data elements within a data input format of the host software application to form a data elements input location plot, and
      iii) associating said data elements input location plot with the mark-up language format, and
   c) operating said intermediary on a mark-up language request to generate a result for use by host system, said result communicating information contained in said mark-up language request.

8. A method of providing mark-up language interaction with a host computer system having a host computer system architecture and a software application executing thereon the software application utilizing host computer system data records and host computer system information processing commands and the mark-up language operating in its native format the method comprising the steps of:
   a) inserting information transfer codes into the host system software application to direct information transfers between the host and an intermediary,
   b) generating metadata for use by an intermediary, said metadata containing an information set of the host computer system architecture and an information set associating the host binary data stream to a mark-up language format to allow intermediary to select a portion of the host binary data stream and allocate said portion to form a mark-up language result,
   c) operating said intermediary on a mark-up language request comprising the steps of:
      i) presenting, to said intermediary, a mark-up language request for a result,
      ii) restructuring said mark-up language request with said intermediary by applying said metadata to said request to provide an inquiry processable by the host system application,
      iii) sending said inquiry from said intermediary to the host system,
      iv) receiving said inquiry by the host system as directed by said transfer codes, and
      v) conducting operations of the host software application in response to said inquiry to generate a result by the host system responsive to said request.

9. A method of providing mark-up language interaction with a host computer system having a host computer system architecture and a software application executing thereon the software application utilizing host computer system data records and host computer system information processing commands and the mark-up language operating in its native format the method comprising the steps of:
   a) inserting information transfer codes into the host system software application to direct information transfers between the host and an intermediary,
   b) generating metadata for use by said intermediary, said metadata coding comprising:
      i) identifying data elements contained in the host software application,
      ii) plotting the location of said identified data elements within a data input format of the host software application to form a data elements input location plot, and
      iii) associating said data elements input location plot with the mark-up language format,
   c) operating said intermediary on a mark-up language request comprising the steps of:
      i) presenting, to said intermediary, a mark-up language request for a result,
      ii) restructuring, by said intermediary, said mark-up language request by applying said data elements association and said data elements input location plot to said request to provide an inquiry processable by the host system application,
      iii) sending said inquiry from said intermediary to the host system,
      iv) receiving said inquiry by the host system as directed by said transfer codes, and
      v) conducting operations of the host system application in response to said inquiry to generate a result by the host system responsive to said request.

10. A method of providing mark-up language interaction with a host computer system having a host computer system architecture and a software application executing thereon the software application utilizing host computer system data records and host computer system information processing commands and the mark-up language operating in its native format the method comprising the steps of:

a) inserting information transfer codes into the host system software application to direct information transfers between the host and an intermediary, b) generating metadata for use by said intermediary, said metadata coding comprising:
   i) identifying data elements contained in the host software application,
   ii) plotting the location of said identified data elements within a data input format and within a data output format of the host software application to form a data elements input location plot and a data elements output location plot,
   iii) associating said data elements input location plot with the mark-up language format and associating said data elements output location plot with the mark-up language format, c) operating said intermediary on a mark-up language request comprising the steps of:
   i) presenting, to said intermediary, a mark-up language request for a result,
   ii) restructuring, by said intermediary, said mark-up language request by applying said data elements input association and said data elements input location plot to said request to provide an inquiry processable by the host system application,
   iii) sending said inquiry from said intermediary to the host system,
   iv) receiving said inquiry by the host system as directed by said transfer codes,
   v) conducting operations of the host system application in response to said inquiry to generate a result by the host system responsive to said request.
   vi) transferring said result from the host system to said intermediary system as directed by said transfer codes,
   vii) processing said result by said intermediary by applying said data elements output association and said data elements output location plot to said result to extract user request-responsive data elements from said result and to form a mark-up language format result from said user request-responsive data elements,
   viii) sending said mark-up language format result to the user, and
   ix) repeating steps i through viii as needed to obtain information.

11. A method of providing mark-up language interaction with a host computer system having a host computer system architecture and a software application executing thereon the software application utilizing host computer system data records and host computer system information processing commands and the mark-up language operating in its native format the method comprising the steps of:

a) inserting information transfer codes into the host system software application to direct information transfers between the host and an intermediary, b) generating metadata for use by said intermediary, said metadata containing an information set of the host computer system architecture and an information set associating the host binary data stream with the mark-up language format to allow said intermediary to select a portion of the host binary data stream and allocate said portion to form a mark-up language result compatible with the mark-up language format, and c) operating said intermediary on a host system software application request to generate a result for restructuring by said intermediary into the mark-up language format.

12. The method as claimed in claim 11 where in said step of generating metadata comprises the step of identifying data elements contained in the host software application.

13. The method as claimed in claim 12 further comprising the step of plotting the location of said identified data elements within a data output format of the host software application to form a data elements output location plot.

14. The method as claimed in claim 13 further comprising the step of associating said data elements output location plot with the mark-up language format.

* * * * *